United States Patent
Baker (10) Patent No.: US 11,461,661 B2
(45) Date of Patent: *Oct. 4, 2022

(54) STOCHASTIC CATEGORICAL AUTOENCODER NETWORK

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,746

(22) Filed: May 6, 2020

(65) Prior Publication Data

US 2020/0265320 A1    Aug. 20, 2020

Related U.S. Application Data

(63) Continuation of application No. 16/124,977, filed on Sep. 7, 2018.

(Continued)

(51) Int. Cl.
*G06N 3/08* (2006.01)
*G06N 3/04* (2006.01)
(Continued)

(52) U.S. Cl.
CPC ........... *G06N 3/088* (2013.01); *G06K 9/6267* (2013.01); *G06N 3/04* (2013.01); *G06N 3/0445* (2013.01);
(Continued)

(58) Field of Classification Search
CPC ........ G06N 3/084; G06N 3/086; G06N 3/088; G06N 3/0445; G06N 3/0454;
(Continued)

(56) References Cited

U.S. PATENT DOCUMENTS 6,128,606 A   10/2000  Bengio et al.
8,527,276 B1   9/2013  Senior et al.
(Continued)

FOREIGN PATENT DOCUMENTS

WO   WO 2018/063840   4/2018

OTHER PUBLICATIONS

Zhou et al. "The Poisson Gamma Belief Network", Advance in Neural Information, pp. 9.*

(Continued)

*Primary Examiner* — Li Wu Chang
(74) *Attorney, Agent, or Firm* — K&L Gates LLP (57) ABSTRACT

Computer systems and methods generate a stochastic categorical autoencoder learning network (SCAN). The SCAN is trained to have an encoder network that outputs, subject to one or more constraints, parameters for parametric probability distributions of sample random variables from input data. The parameters comprise measures of central tendency and measures of dispersion. The one or more constraints comprise a first constraint that constrains a measure of a magnitude of a vector of the measures of central tendency as compared to a measure of a magnitude of a vector of the measures of dispersion. Thereafter, the sample random variables are generated from the parameters and a decoder is trained to output the input data from the sample random variables.

23 Claims, 7 Drawing Sheets

Related U.S. Application Data (60) Provisional application No. 62/564,754, filed on Aug. 29, 2017.

(51) Int. Cl.
| | |
|---|---|
| *G06N 20/00* | (2019.01) |
| *G06N 7/00* | (2006.01) |
| *G06K 9/62* | (2022.01) |
| *G06N 3/063* | (2006.01) |
| *G06F 17/18* | (2006.01) |
| *G06F 12/0815* | (2016.01) |

(52) U.S. Cl.
CPC ......... *G06N 3/0454* (2013.01); *G06N 3/0472* (2013.01); *G06N 3/063* (2013.01); *G06N 3/084* (2013.01); *G06N 7/005* (2013.01); *G06N 20/00* (2019.01); *G06F 12/0815* (2013.01); *G06F 17/18* (2013.01); *G06N 3/0481* (2013.01)

(58) Field of Classification Search
CPC ...... G06N 3/0472; G06N 3/0481; G06N 3/04; G06N 99/002; G06N 20/00; G06T 11/001; G06T 7/45; G06F 17/18
See application file for complete search history.

(56) References Cited

U.S. PATENT DOCUMENTS

| | | |
|---|---|---|
| 10,552,730 B2 | 2/2020 | Yumer et al. |
| 2010/0324708 A1 | 12/2010 | Ojanpera |
| 2014/0358828 A1 | 12/2014 | Phillipps et al. |
| 2017/0328194 A1 | 11/2017 | Liu et al. |
| 2018/0024968 A1 | 1/2018 | Clinchant et al. |
| 2018/0165554 A1 | 6/2018 | Zhang |
| 2019/0026631 A1 | 1/2019 | Carr et al. |

OTHER PUBLICATIONS

Normal distribution https://web.archive.org/web/20161228165644/https://en.wikipedia.org/wiki/Norma_distribution, 2016, p. 1.*
Higgins et al. "B-VAE: Learning Basic Visual Concepts With a Constrained Variational Framework", ICLR 2017, pp. 22.*
Multivariate normal distribution, http://web.archive.org/web/20170806100949/https://en.wikipedia.org/wiki/Multivariate_normal_distribution, 2017 pp. 12.*
An et al., "Variational Autoencoder based Anomaly Detection using Reconstruction Probability," Special Lecture on IE, Dec. 27, 2015, 18 pages.
Bengio, et al., "Deep Generative Stochastic Networks Trainable by Backprop," Proceedings of the $31^{st}$ ICML, Beijing, China, 2014, JMLR: W&CP vol. 32, 9 pages.
Bengio, et al., "Estimating or Propagating Gradients through Stochastic Neurons for Conditional Computation," arXix:1308.3432v1 [cs.LG], Aug. 15, 2013, 12 pages.
Camino, et al., "Generating Multi-Categorical Samples with Generative Adversarial Networks," ICML 2018 workshop on Theoretical Foundations and Applications of Deep Generative Models, Stockholm, Sweden, Jul. 4, 2018, 7 pages.
Dilokthanakul, et al. "Deep Unsupervised Clustering with Gaussian Mixture Variational Autoencoders," Conference paper at ICLR 2017, arXiv:1611.02648v2 [cs.LG] Jan. 13, 2017, 12 pages.
Gondara, et al., "Multiple Imputation Using Deep Denoising Autoencoders," Department of Computing Science, Simon Fraser University, Burnaby, BC, Canada, arXiv:1705.02737v2 [cs.LG] May 19, 2017, 13 pages.
Goodfellow, et al., "Generative Adversarial Nets," NIPS'2014, arXix:1406.2661v1 [stat.ML] Jun. 10, 2014, 9 pages.
Goodfellow,"On Distinguishability Criteria for Estimating Generative Models, ICLR'2015 workshops track", arXix:1412.6515v4 [stat.ML] May 21, 2015, 6 pages.
Kingma, et al. "Auto-Encoding Variational Bayes," Proceedings ICLR 2014, arXiv:1312.6114v10 [stat.ML], May 1, 2014, 14 pages.
Kingma, "Fast Gradient-Based Inference with Continuous Latent Variable Models in Auxiliary Form", Intelligent Autonomous Systems Group, Universiteit van Amsterdam, arXiv:1306.0733v1 [cs.LG] 4, Jun. 2013, 9 pages.
Louizos, et al., "The Variational Fair Autoencoder," arXiv:1511.00830v6[statML]Aug. 10, 2017, 11 pages.
Makhzani, et al., "Adversarial Autoencoders," arXiv:1511.05644v2 [cs.LG] May 25, 2016, 16 pages.
Makhzani, et ai., "Implicit Autoencoders," Vector Institute for Artificial Intelligence, University of Toronto, arXiv:1805.09804v1 [cs.LG] May 24, 2018, 11 pages.
Radford, et al., "Unsupervised Representation Learning with Deep Convolutional Generative Adversarial Networks," ICLR 2016, arXiv:1511.06434v2 [cs.LG] Jan. 7, 2016, 16 pages.
Rezende, eta l. "Stochastic Backpropagation and Approximate Inference in Deep Generative Models," Proceedings of $31^{st}$ ICML, Beijing, China, 2014, arXiv:1401.4082v3 [stat.ML] May 30, 2014, 14 pages.
Roberts, et al., "Hierarchical Variational Autoencoders for Music," 31st Conference on Neural Information Processing Systems (NIPS 2017), Long Beach, CA, USA, 6 pages.
Springenberg, Jet al. "Unsupervised and Semi-Supervised Learning With Categorical Generative Adversarial Networks" Published as a conference paper at ICLR 2016; Publication [online], Apr. 30, 2016 [retrieved Oct. 31, 2018]. Retrieved from the Internet: <URL: https://arxiv.org/pdf/1511.06390.pdf>; pp. 1-20.
Salunkhe, Set al. "A Plagiarism Detection Mechanism using Reinforcement Learning"; International Journal of Advance Research in Computer Science and Management Studies, vol. 1, Issue 6; Publication [online], Nov. 2013 [retrieved Oct. 31, 2018], Retrieved from the Internet: <URL: http://www.ijarcsms.com/docs/paper/volume1/issue6N116-0019.pdf>; pp. 125-129.
Suzuki, et al., "Improving Bi-directional Generation between Different Modalities with Variational Autoencoders," The University of Tokyo, Japan, arXiv:1801.08702v1 [stat.ML] Jan. 26, 2018, 10 pages.
Xu, Weidi, et al., "Variational Autoencoder for Semi-Supervised Text Classification," Proceedings of the $31^{st}$ AAAI Conference on AI (AAAI-17), 2017, pp. 3358-3364.

* cited by examiner

STOCHASTIC CATEGORICAL AUTOENCODER NETWORK

PRIORITY CLAIM

The present application is a continuation of U.S. application Ser. No. 16/124,977, filed Sep. 7, 2018, which application claims priority to U.S. provisional patent application Ser. No. 62/564,754, entitled "Aggressive Development with Cooperative Generators," filed Sep. 28, 2017, ("the '754 Provisional Application"), which is incorporated herein by reference in its entirety.

BACKGROUND

Two methods, Variational Autoencoders (VAEs) and Generative Adversarial Networks (GANs), have emerged as leading techniques for generative modeling within artificial intelligence and deep learning. Generative modeling is an active and growing subfield within unsupervised and semi-supervised machine learning. The goal of generative models is to represent the latent variables that describe a data distribution that can produce or reproduce data examples in high-dimensional space. One typical example is images, where generative models can be used to produce new images that appear realistic and are highly similar to those in a set of training examples, without exactly reproducing the existing images on which the generative model was trained. Trained with stochastic gradient descent in coordination with deep neural networks that serve as universal function approximators, VAEs and GANs can be used to generate many types of realistic data.

A key aspect of generative models is that they should not simply reproduce data examples used in training, but should be able to generate novel data that is similar to, but different from, any example in the training set. VAEs attempt to achieve this objective by simultaneously minimizing divergence between generated data and source data and minimizing divergence between latent variables in a stochastic layer and unit Gaussians or other simple statistical distribution. This latter source of regularization has the effect of compressing differences between the latent variables, an undesirable feature when data is drawn from multiple categorical distributions. GANs are designed to produce sharp, highly-realistic images through an iterative competition between a generator and a discriminator that attempts to distinguish between real data and generated data. GANs frequently suffer from mode collapse, where the GAN generates representatives of only a small proper subset of the modes of a multi-modal distribution, in some cases generating representatives of only a single mode. This reduces diversity among generated data and limits the usefulness of GANs in some applications.

SUMMARY

The present invention, in one general aspect, is designed to overcome these and other limitations in VAEs and GANs by using a new type of autoencoder network, referred to herein as "Stochastic Categorical Autoencoder Networks" or "SCANs." SCANs, as described herein, are similar to VAEs in that they comprise an encoder, a stochastic representation layer, and a decoder, but use a different regularization error term and introduce many hyperparameters for detailed control of the stochastic representation layer. As such, SCANs can access a much richer parametric family of distributions and provide more effective knowledge transmission from an encoder to a decoder. They are better able to represent multiple distinct latent data classes or clusters. At the same time, they do not suffer from mode collapse or identical copying of training data, the way GANs can. These and other benefits of the present invention will be apparent from the description that follows.

FIGURES

Various embodiments of the present invention are described herein by way of example in connection with the following figures, wherein.

DETAILED DESCRIPTION

Figure 4:
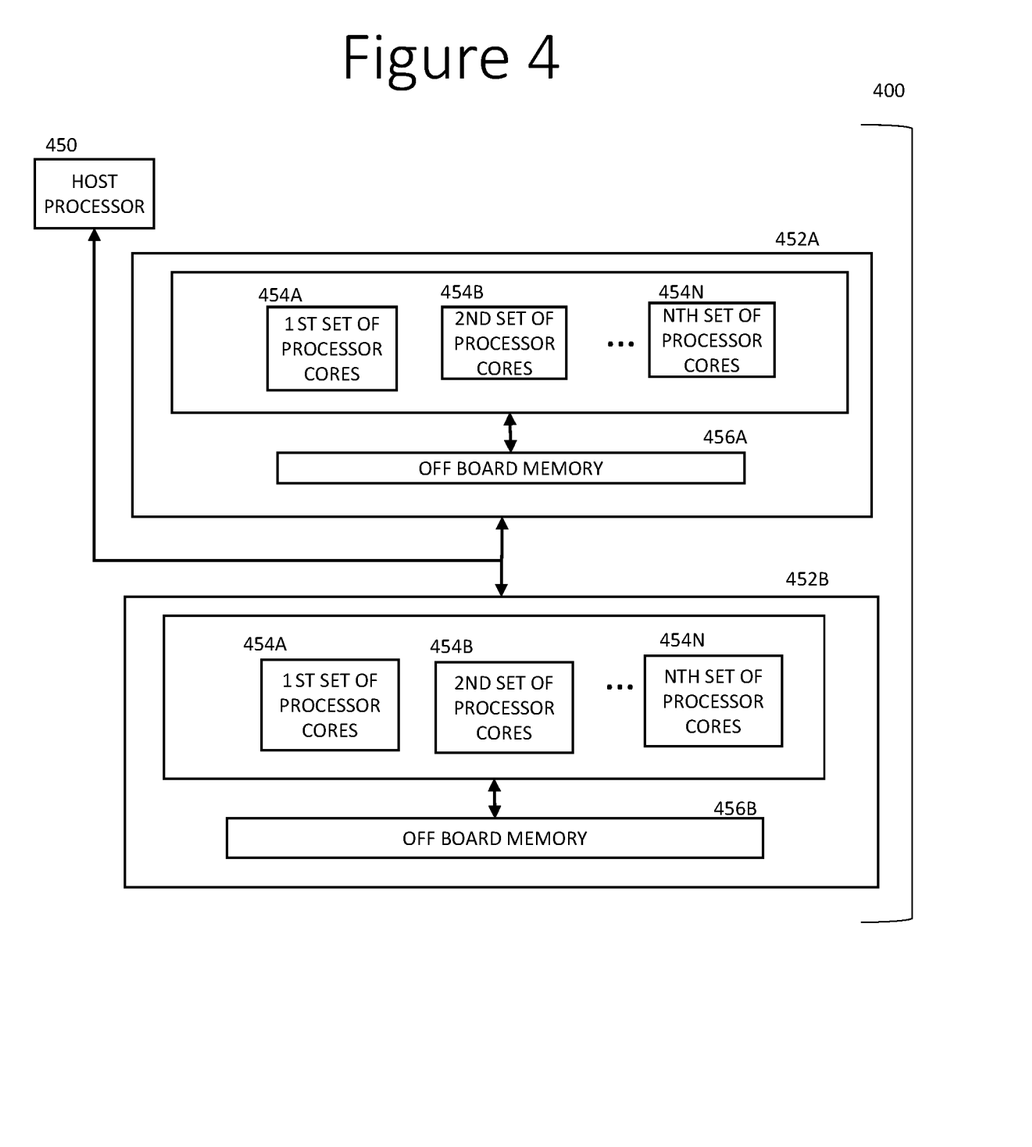
FIG. 4 is a diagram of computer system that may be used to implement various embodiments, according to one aspect of this disclosure.
Figure 5:
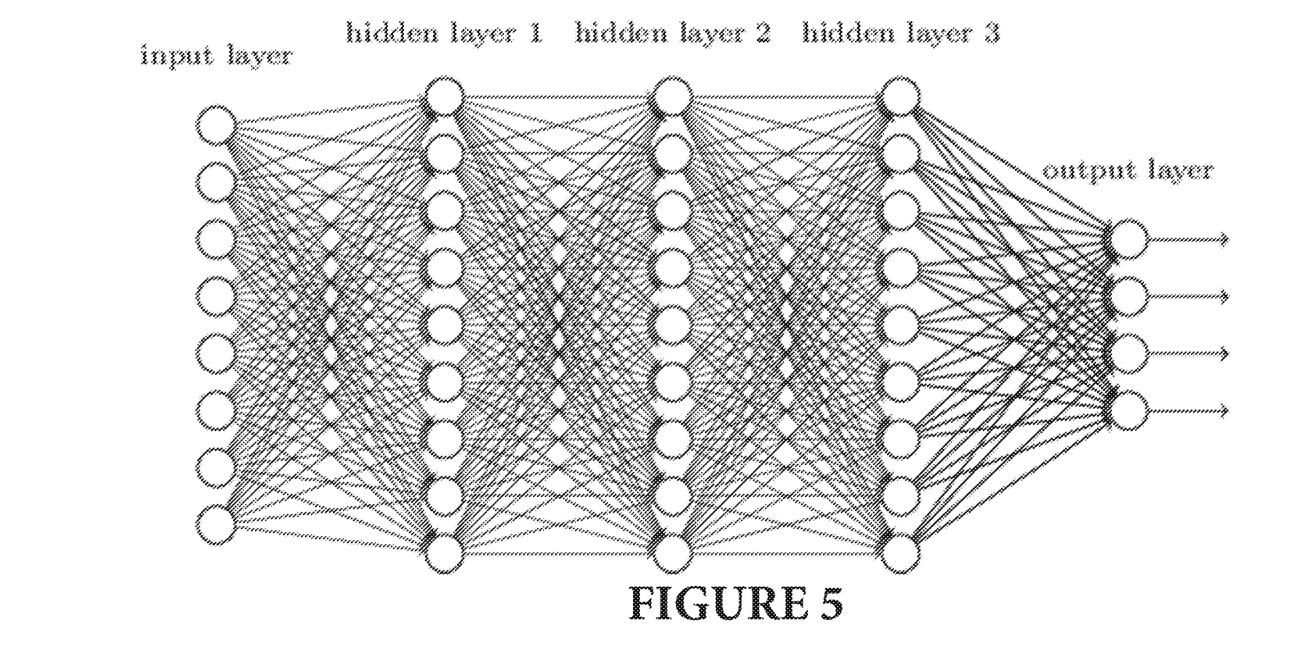
FIG. 5 is a diagram illustrating a deep neural network of the type that might be used in various aspects of various embodiments of the invention.

Many components of the current invention are neural networks. Before explaining further the components of the current invention, a summary explanation of neural networks is provided. A diagram of an example neural network is shown in FIG. 5. As shown in this figure, a neural network is a collection of nodes and directed arcs. The nodes in a neural network are often organized into layers. In a feed-forward neural network, the layers may be numbered from bottom to top, when diagramed as in FIG. 5. Each directed arc in a layered feed-forward neural network goes from a source node in a lower layer to a destination node in a higher layer. The feed-forward neural network shown in FIG. 5 has an input layer, an output layer, and three inner layers. An inner layer in a neural network is also called a "hidden" layer. Each directed arc is associated with a numerical value called its "weight." Typically, each node other than an input node is associated with a numerical value called its "bias." The weights and biases of a neural network are called "learned" parameters. During training, the values of the learned parameters are adjusted by a computer system such as the computer system 400 shown in FIG. 4. Other parameters that control the training process are called hyperparameters.

A feed-forward neural network may be trained by the computer system 400 using an iterative process of stochastic gradient descent with one iterative update of the learned parameters for each minibatch. The full batch of training data is typically arranged into a set of smaller, disjoint sets called minibatches. An epoch comprises the computer system 400 doing a stochastic gradient descent update for each minibatch contained in the full batch of training data. For each minibatch, the computer system 400 estimates the gradient of the objective for a training data item by first computing the activation of each node in the network using a feed-forward activation computation. The computer system 400 then estimates the partial derivatives of the objective with respect to the learned parameters using a process called "back-propagation," which computes the partial derivatives based on the chain rule of calculus, proceeding backwards through the layers of the network. The processes of stochastic gradient descent, feed-forward computation, and back-propagation are well-known to those skilled in the art of training neural networks.

Figure 1:
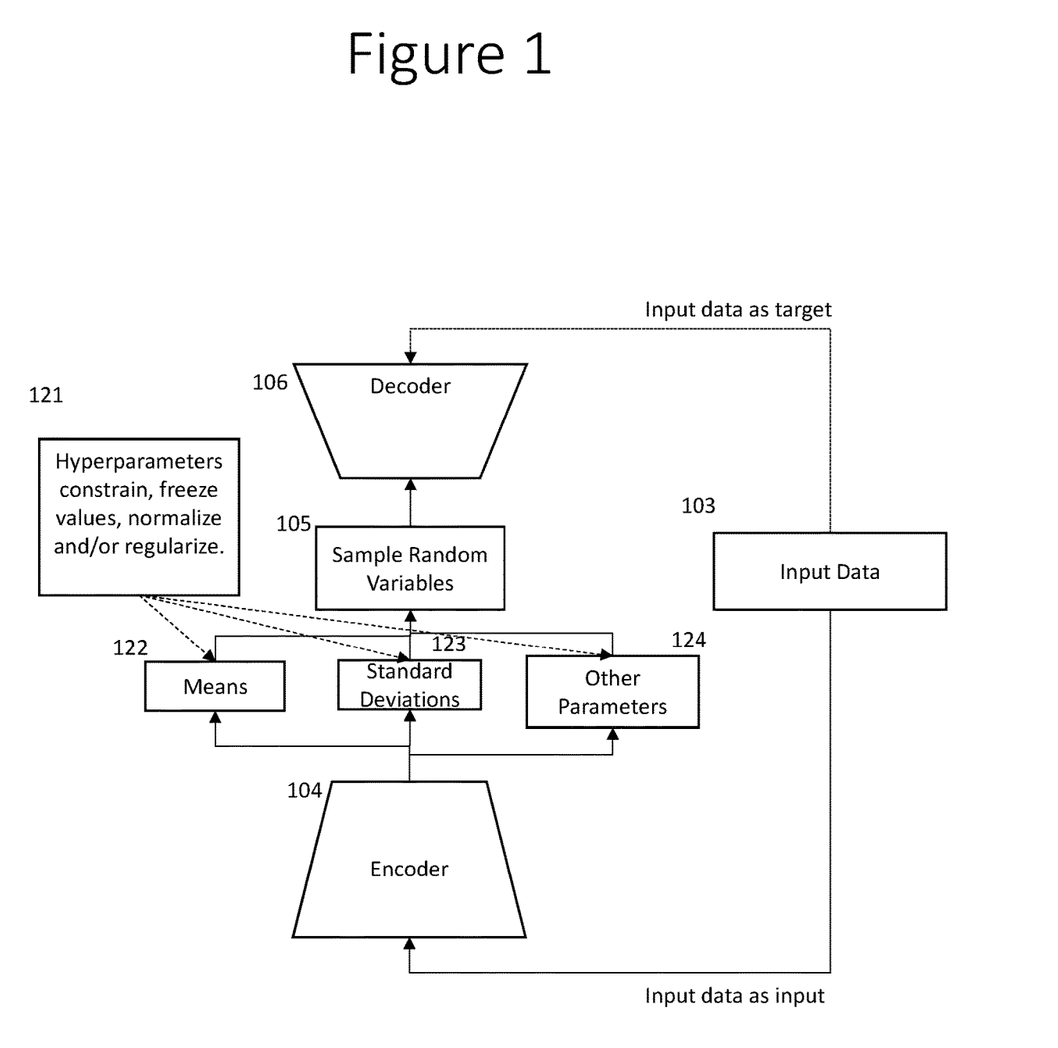
FIG. 1 illustrates a block diagram of a stochastic categorical autoencoder network, according to one aspect of this disclosure.

Having generally summarized neural networks, attention is now directed to FIG. 1, which shows a block diagram of a stochastic categorical autoencoder network (SCAN) according to various embodiments of the present invention. A SCAN is a type of autoencoder that can also be used as a generator and comprises, as shown in FIG. 1, an encoder 104 and a decoder 106, and uses the following items input data 103; a sample of random variables 105 specified by the parameters of a parametric probability distribution, such as means (or other measures of central tendency) 122, standard deviations (or other measures of dispersion) 123, and optionally other parameters 124; and hyperparameters 121 for the encoder and decoder networks 104, 106. An autoencoder is a type of network that is well-known to those skilled in the art of deep neural networks. An autoencoder network is sometimes said to learn by "unsupervised" training, because it does not require labeled training data. More precisely, an autoencoder network learns by "self-supervised" training. The learning of an autoencoder network may use stochastic gradient descent training just as in supervised training. However, the autoencoder provides its own objective target, which is just a copy of the input 103.

In this embodiment as well as in autoencoders in general, the input 103 is encoded by an encoder network 104 to a reduced representation in a bottleneck layer, herein represented in the form of sample random variables 105. In an illustrative embodiment, the random variables are represented as statistically independent random variables with a parameter distribution for each random variable. The distributions of the sample random variables 105 are represented by parameters related to their respective parametric probability distributions. Preferably, the parameters of each parametric distribution include a measure of central tendency, such as the mean (122), and a measure of dispersion, such as the standard deviation (123) and, optionally, other parameters (124), all controlled by hyperparameters 121. Means (122) and standard deviations (123) or variances are sufficient parameters, for example, for independent Gaussian random variables. Other examples of parametric distributions are discussed below. The encoder 104 generates the probability distribution parameters 122, 123, 124 from the input data 103 based on the controlling hyperparameters 121. The computer system 400 then generates sample random variables 105 (e.g., through a random number generator program) that adhere to or satisfy the probability distribution parameters 122-124 for input to the decoder 106. FIG. 1 shows that, and the description below assumes that, means (122) and standard deviations 123 are used, but in other embodiments, other statistics of central tendency than means may be used and other dispersion statistics may be used, such as variances in lieu of standard deviations. For some parametric distributions, for example, Bernoulli distributions and Poisson distributions, a single distribution parameter determines both the mean and the standard deviation. Such distributions are discussed as a special case below. It should therefore be recognized that the present invention is not necessarily limited to the use of means and standard deviations. Preferably, when a parametric distribution may be represented with parameters representing central tendency and dispersion or with another parametric representation, a parametric representation with parameters representing central tendency and dispersion is chosen. For example, a uniform distribution over the range [a, b] may be represented by the two parameters: (i) the midrange m=(a+b)/2 and (ii) the range r=(b−a), rather than by the parameters a and b.

Both the encoder 104 and decoder 106 may be implemented with neural networks. The statistics 122, 123, 124 (if any) are the output layer of the encoder 104 and the node activation values in blocks 122, 123 and 124 (if any) can also be called "latent variables" because their role is similar to that of latent variables in probabilistic inference. The sample random variables 105 (akin to a bottleneck layer) that satisfy the statistics 122-124 are then decoded by a decoder network 106 to produce an output that is as close as possible to a copy of the input 103. The autoencoder 104 is not in general able to produce an exact copy of the input because the sample random variables 105 are significantly restricted by the controlling statistics 122-124, preventing the autoencoder network 104 from representing the identity function. As can be seen in FIG. 1, a SCAN is similar to a deterministic autoencoder, except the bottleneck layer has been replaced by stochastic sampling from the probability distribution 105, specified by the parameters of the probability distribution 122, 123, and possibly 124. A SCAN is similar to a VAE, except it uses a different regularization error term and introduces many hyperparameters for detailed control of the regularization.

Training an autoencoder, including a SCAN, generally comprises the steps of: obtaining a set of training data; for each item of training data conducting a feed-forward pass to compute node activations at each layer and generating an output from decoder 106; comparing the deviation of the generated output using the original input as the target; back propagating the error through the network; and performing weight updates for all network connections. This process is well known to those skilled in the art of training autoencoders. Various standard techniques are typically incorporated into the training procedure, including performing weight updates after minibatches of training data, incorporating momentum into weight updates, weight decay, and other regularization procedures. Each of these optional techniques is well known to those skilled in the art of training autoencoders.

To avoid the problem of the encoder network model simply learning the identity function, an autoencoder needs to have some form of restriction in the representational power of the code layer. In a deterministic autoencoder, this restriction typically takes the form of a bottleneck layer that requires a reduced representation of the data through requiring either (i) a much smaller number of nodes than the input, or (ii) activations of the bottleneck layer that are sparse, that is, the non-negligible activations of the nodes in the bottleneck layer are restricted to a small subset of nodes. VAEs replace the bottleneck layer with a stochastic representation of the distribution from which the data is drawn. The loss function used in training a VAE incorporates a measure of divergence between reconstructed data and the source data as well as a second term representing the Kullback-Leibler divergence between the latent variables in the stochastic layer and zero-mean unit Gaussians or other specified simple statistical distributions. Regularizing the latent variables serves the same purpose as the restrictions in the bottleneck layer of a deterministic autoencoder, thus discouraging simple memorization of the training data. One drawback with this approach is that it has the effect of reducing differences between the latent variables for different categories, decreasing their capacity to differentially represent distinct categories or classes in the data.

A SCAN removes the regularization in the latent variables of a VAE. As a result, a SCAN generates a much richer parametric family of distributions and more effective knowledge transmission from the encoder 104 to the decoder 106 than does a VAE. Hyperparameters 121 control or constrain the latent variables in the stochastic layer. To avoid the problem of the encoder network simply learning the identity function, a SCAN may have constraints on its latent variables. For example, the magnitude of the means or other measures of central tendency 122 may be constrained relative to the magnitude of the standard deviations or other measure of dispersion 123. Otherwise, the encoder could encode an arbitrary amount of information in the means and also scale the means to be very large relative to the standard deviations. This tactic would produce a network that would, in the limit, be equivalent to a deterministic autoencoder with no bottleneck. For example, the encoder could simply multiply each input by a very large factor S, use those values as the means and use a very small value for each standard deviation. The decoder could learn to divide each random variable by S and get the input values with a very small standard deviation. However, like the identity function for a deterministic autoencoder, this encoding and decoding strategy would not have learned a useful knowledge representation.

To prevent such a strategy, it is preferable to constrain some measure of the magnitude of the vector of means or other measure of central tendency compared to the magnitude of the vector of the standard deviations or other measure of dispersion. That is, for some norm, the vector of means should be constrained to have a norm no greater than some specified value, say 1.0, and the vector of standard deviations should be constrained to have a norm no less than some specified value, say 1.0. Some embodiments use a smaller norm for the standard deviations. For example, a SCAN used to generate data augmentation for individual data examples may use a smaller standard deviation, such as 0.1. The essential requirement is that both the means and standard deviations be constrained such that the means cannot grow arbitrarily large relative to the standard deviations (or other measures of central tendency and dispersion if used). Note that some parametric distributions, such as the Bernoulli distribution and the Poisson distribution, inherently satisfy such a condition, so no extra constraint needs to be applied in that case. These distributions do not need to have separate parameters (123) representing the dispersion.

Which vector norm to use is a design decision. Some embodiments of present invention can constrain the maximum absolute value of the means and the maximum absolute value of the standard deviations, that is, use the sup norm. Some embodiments can use the L2 norm and constrain the square root of average of the squares of the means and the square root of average of the squares of the standard deviations. Some embodiments can use the L1 norm and constrain the average of the absolute values of the means and the average of the absolute values of the standard deviations. Some embodiments can use a different norm for the means than for the standard deviations. Some embodiments can constrain the means to have a norm less than or equal to the specified constraint, while some embodiments can constrain the means to have a norm equal to the specified value. Some embodiments can constrain the standard deviations to have a norm greater than or equal to the specified value, while some can constrain the standard deviations to have a norm equal to the specified value. The specified value of each norm is controlled by a hyperparameter. Some embodiments have a hyperparameter for each mean and each standard deviation, whereas some embodiments can use a default value, say 1.0, for each norm.

Each of the procedures mentioned in the previous paragraph as used with the node activations representing the means (122) can also be done with the node activations representing the variances or standard deviations (123), and vice versa. However, the characteristics and the objectives are quite different, so different procedures are preferred. For example, the degree to which a generator used for data augmentation enhances robustness and encourages generalization depends to some extent on the ratio of the standard deviation to the mean. For this objective, the individual means (122) or their vector norm should be limited to be less than or equal to a specified value, but the individual standard deviations should be limited to be greater than or equal to some specified value.

Another aspect of the difference between the latent variables for the means (122) and the latent variables for the standard deviations (123) is that the means (122) are more effective than the latent variables for the standard deviations (123) at conveying information about the current pattern from the encoder 104 to the decoder 106.

In an illustrative embodiment, each latent variable associated with a standard deviation may be treated as a hyperparameter, rather than as a learned parameter. Equivalently an associated hyperparameter may specify the value of the latent variable. For example, in some embodiments, each standard deviation may be set to the value 1.0. The means 122 and the encoder 106 then learn to generate the desired patterns subject to that constraint.

The best value for the ratio of the standard deviations (123) to the means (122) depends to a significant degree on the purpose for the SCAN-based generator. Such external consideration can be handled better in the development process than in the back-propagation training. For example, if the generated data is to be used to represent greater variability to make a classifier more robust, then the standard deviation should be large enough to fill in most of the gaps in the training data without being so large as to create substantial overlap between the data generated for one category with the data generated for another. There is some intermediate value that represents the best trade-off. This trade-off is difficult to represent as an error cost objective, but the optimum value can be found by experimentation during development, which can measure the actual performance on development data. This experimentation is an example of hyperparameter tuning, which is well-known to those skilled in the art of machine learning. This hyperparameter tuning can be automated by a separate machine learning system, called a learning coach. A learning coach is a second machine learning system that is trained to help manage the learning process of a first machine learning system. Learning coaches are described in more detail in the following applications, which are incorporated herein by reference in their entirety: PCT Application No. PCT/US17/52037, filed Sep. 18, 2017, entitled "LEARNING COACH FOR MACHINE LEARNING SYSTEM"; and PCT Application No. PCT/US18/20887, filed Mar. 5, 2018, entitled "LEARNING COACH FOR MACHINE LEARNING SYSTEM".

A similar trade-off optimization occurs if the SCAN-based generator is being used for data augmentation to smooth out the decision boundaries in a classifier and make them somewhat fuzzy. This technique lessens the tendency for training to overfit, even when there are enough learned parameters to do so. It is also clear that too much uncertainty at the decision boundary will be detrimental. The best trade-off value can be found by experimentation using development data. This experimentation is an example of hyperparameter tuning, which is well-known to those skilled in the art of machine learning.

The decoder 106 preferably is a multi-layer, feed forward neural network and therefore is a universal approximator. Any d-dimensional distribution can be generated by taking a set of d normally-distributed variables and mapping the set through a sufficiently complicated function. Therefore, most embodiments use simple probability distributions for block 105, typically independent Gaussian distributions or uniform distributions, leaving it to the decoder 106 to transform the random samples 105 to more complex, non-independent distributions, if necessary. In these Gaussian-based embodiments, there are no additional probability distribution parameters 124.

In an illustrative embodiment, the probability distributions for the random sample variables 105 are independent Gaussians, and the latent variables are the means 122 and standard deviations 123. There is no loss of generality in assuming independent Gaussians, rather than, say, dependent Gaussians with a full covariance matrix, because the decoder 106 can effectively learn the transformation necessary to transform independent random variables to random variables with an arbitrary covariance matrix.

Figure 2:
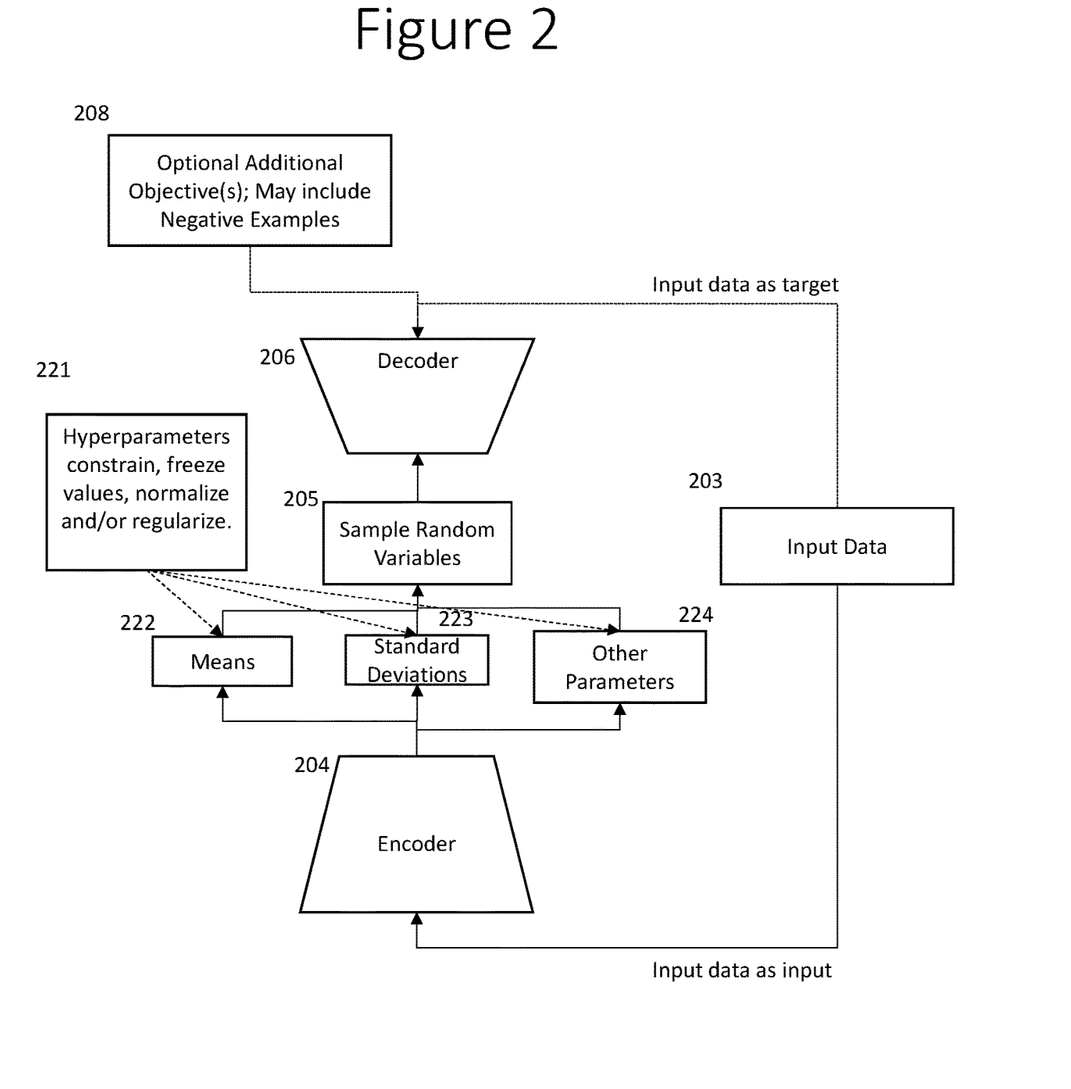
FIG. 2 illustrates a block diagram of an enhanced stochastic categorical autoencoder network, according to one aspect of this disclosure.

FIG. 2 is a block diagram of an illustrative embodiment of an enhanced stochastic categorical autoencoder network (SCAN+). A SCAN+ is similar to a SCAN, as described in association with FIG. 1, with the addition of additional objectives 208. An important additional objective is to avoid producing undesired examples. For example, if the embodiment shown in FIG. 2 is intended to generate examples of a designated category, then block 208 could include a classifier or detector that would back propagate through the SCAN an error cost gradient if a generated example from the SCAN matches a different category or is rejected by the detector 208. In some embodiments, negative examples from an external source are used for negative training. Gradients from the error cost function of the classifier can be back propagated through the example pattern even though the pattern came from an external source and was not produced by the generator.

In some embodiments, block 208 also includes one or more negative examples. A negative example is a data example that a generator is trained to avoid generating. In an illustrative embodiment, block 208 includes a classifier "Neg" that is trained to detect any of one or more negative examples. That classifier back propagates negative feedback to the decoder 206 when classifier Neg detects any of the negative examples. As a classifier, Neg generalizes from its training examples and gives negative feedback to decoder 206 for any example the Neg classifies as a detection of a negative example. In some embodiments, negative examples are used to inhibit a generator that is trained to produce examples for a specified category from producing examples of any other category. Negative examples can also be used when a generator is used for data augmentation for one or more individual data examples.

In another illustrative embodiment, a SCAN+ may have a real-vs-generated discriminator as an additional objective 208, as in a Generative Adversarial Network (GAN). In one embodiment, the real-vs-generated discriminator would not be in a two-person zero-sum game adversarial relationship with the discriminator, unlike a GAN. Because a SCAN or SCAN+ generates patterns specific to the set of data examples for which it has trained vectors of latent variables, in a preferred embodiment it can generate patterns specific to a set of data examples that is disjoint from the set of real examples on which the real-vs-generated discriminator is trained. This extra objective in block 208 helps the SCAN+ produce more realistic patterns without mode collapse.

Figure 3:
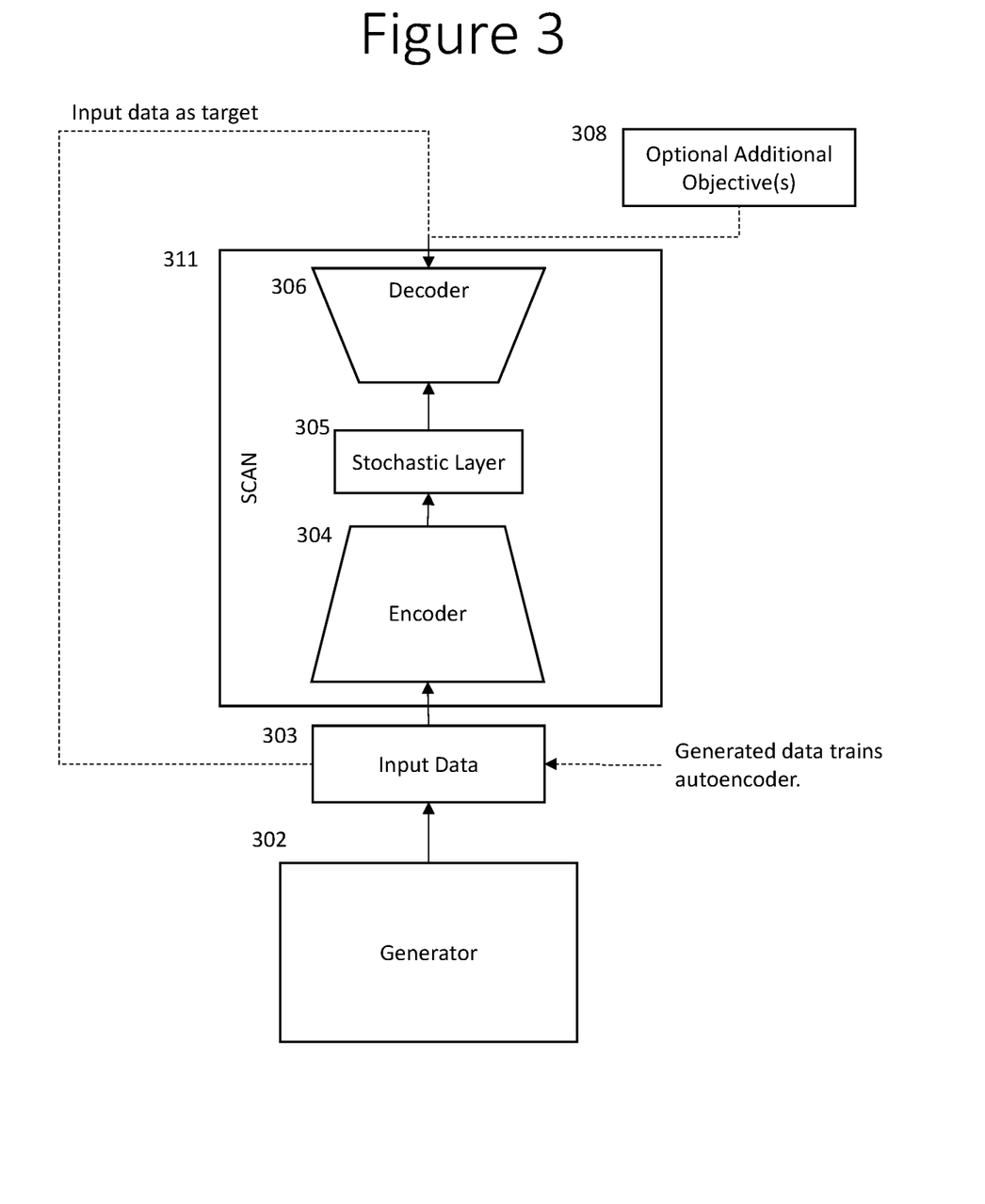
FIG. 3 illustrates a block diagram of several types of autoencoder networks that are fed data via a generator, according to one aspect of this disclosure.

FIG. 3 is a block diagram that illustrates the point that a SCAN does not require real data for training. Learning to reproduce a pattern in spite of a bottleneck or other restriction requires essentially the same capability when the pattern is a generated pattern as when the pattern is a real pattern. FIG. 3 trains a SCAN 311 by providing as input data 303 data that are produced by a generator 302. In this example, the SCAN 311 comprises an encoder 304, a stochastic layer 305, and a decoder 306. It is trained by back propagation from an error function that compares its output with a copy of the input 303 and, possibly from additional objectives 308, as described in conjunction with FIGS. 1 and 2.

The important properties that allow the SCAN to be trained using generated data are 1) the objective is known because it is simply a copy of the input 303, and 2) the task that the SCAN must learn is similar on generated data to the task on real data. Therefore, the training data can be supplied from a generator. That means that the embodiment shown in FIG. 3 is a case in which there is an unlimited amount of training data, which in turn means that, no matter how large the network, enough training data can be generated so that the network does not have the capacity merely to simply memorize the training data. Memorizing the training data is not an issue when the only objective is the auto-encoding objective. However, it may be important in avoiding overfitting to an objective from 308.

A SCAN or SCAN+ can be used for a number of purposes, including as examples without limitation: generating data, reducing degradation in obtained and/or generated data, data augmentation for other machine learning systems, and transforming data examples. Illustrative examples of each of these purposes will be described in the following sections.

A first use of a SCAN is to create example-specific augmented data and controls. The SCAN can generate data that is related to a designated example or a small set of examples. A hyperparameter can control the ratio of the standard deviation used during generation to the value of the latent variable during training, thus controlling the amount of spread of the generated data around the designated example. A separate hyperparameter can control each standard deviation, which is useful, for example, if some of the latent variables have been trained to be feature detectors, as can be done by SCANs. SCANs can also be trained to avoid generating data examples that get classified as a different category or to avoid generating data that is like designated negative examples, as illustrated by block 208 of FIG. 2.

The augmented data serves several purposes. First, large machine learning systems, especially large neural networks, need a large amount of training data. The performance of these machine learning systems gets better with the more data that is available. In general, generated data is not as useful as an equal amount of real data, but more data of any kind is always useful. For example, even noisy data and distortions make the trained system more robust and reduce errors caused by variability in real data. Example-specific generated data is even more useful in some embodiments because it can be targeted at specific problem regions.

Second, data augmentation from a SCAN fills in the data space with a smooth probability distribution, reducing the tendency for a classifier to overfit.

Finally, the ability of a SCAN to be trained to avoid negative examples can be used as a guide to the generation of examples that will help train a classifier to learn a manifold that steers around nearby clusters of other categories.

Figure 4A:
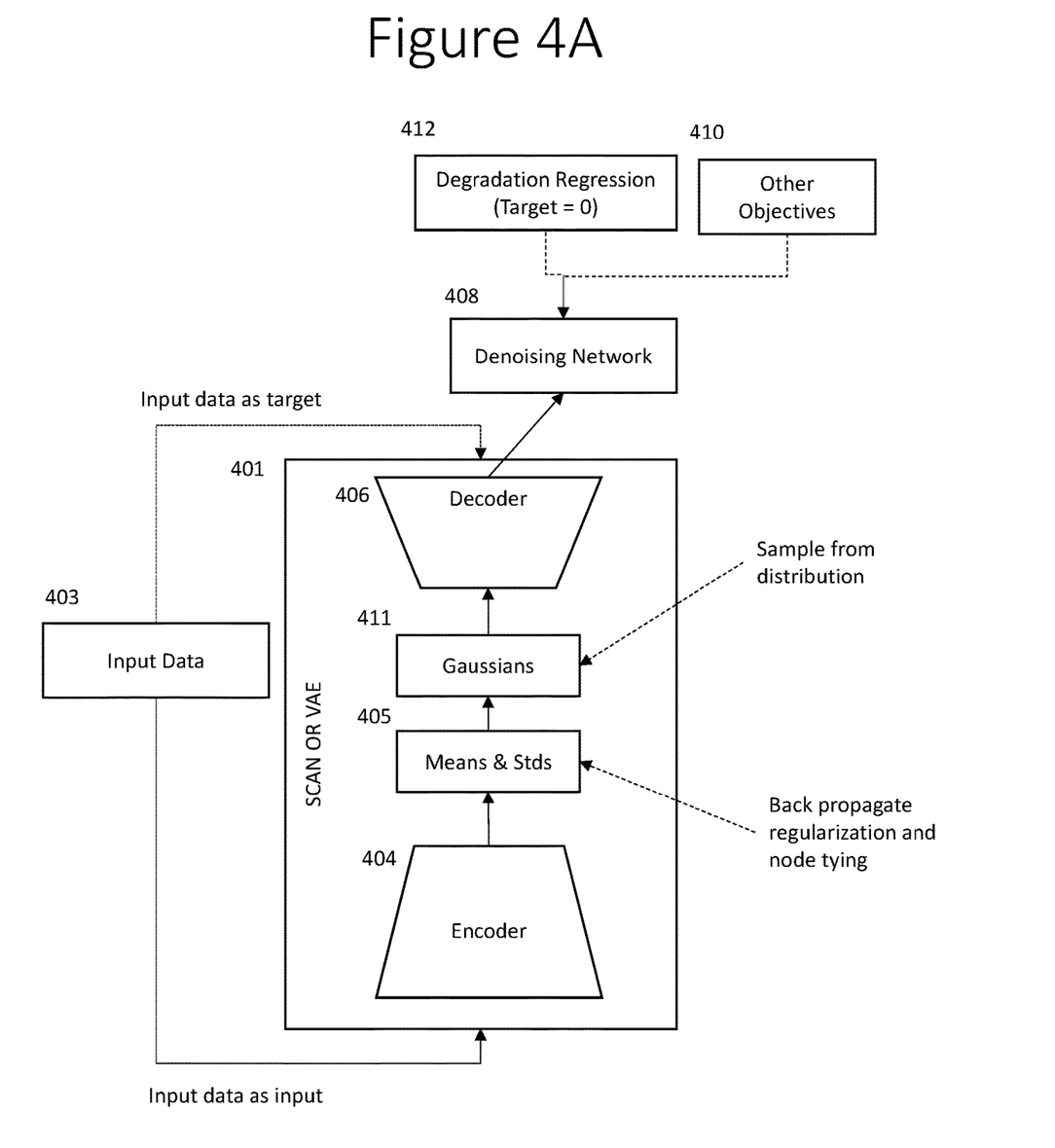
FIG. 4A illustrates a block diagram of a stochastic categorical autoencoder network with degradation regression, according to one aspect of this disclosure.

FIG. 4A shows an illustrative embodiment in which a degradation regression system 412 is added to a stochastic categorical autoencoder network 401. In this embodiment, a denoising system 408 is also added. The degradation regression system 412 can be implemented with a machine learning system that has previously been trained to estimate the amount of degradation is a pattern that is due to noise. In the operation of the illustrative embodiment shown in FIG. 4A, the degradation regression system 412 is not being trained. The degradation regression system 412 preferably computes the partial derivatives of an objective, which is having its estimate of the degradation being zero—not to update its own learned parameters—but instead to back propagate the derivatives of the objective of zero degradation to the denoising system 408. The denoising system 408 is trained to remove the noise that may be present in the output of decoder 406, which is also the output of overall stochastic autoencoder 401. For example, the denoising system 408 may learn to sharpen a fuzzy image produced by a SCAN or by a Variational Autoencoder (VAE) to produce more realistic images like a Generative Adversarial Network (GAN). If the input data is noisy, the denoising system 408 may learn to clean up the image, so that the SCAN 401, plus denoising system 408 in that case, may act like a denoising autoencoder.

The training of a SCAN performs averaging over randomly generated samples, which generally results in output patterns being somewhat blurred. This blurring is one of the disadvantages of a SCAN or VAE compared, for example, to a GAN. Preferably, the degradation regression system 412 is trained on data examples in which some or all of the examples of degradation are examples of the output of a SCAN or VAE.

During normal training of a SCAN, the configuration consists of blocks 403, 404, 405, 411, and 406. These components and the training process for a network including these components have been described above in connection with FIG. 1. During generation, only blocks 405, 411 and 406 are present. In the embodiment shown in FIG. 4A, the training is modified to include back propagation from the degradation regression system 412 as well as back propagation through the denoising network 408, in addition to the normal error cost function from the input 403 directly back to the output of the SCAN 401.

The degradation regression system 412 and the denoising network 408 both have preferably already been trained prior to training the SCAN 401 with back propagation from them. The degradation regression system 412 back propagates from the objective of zero degradation, as described above.

The degradation regression system 412 is not trained during the training process illustrated in FIG. 4A. Optionally, the denoising network 408 may have additional training during the training process illustrated in FIG. 4A. Optionally, block 410 back propagates additional objectives for the training of the SCAN 401.

FIG. 4 is a diagram of a computer system computer system 400 that could be used to implement the embodiments described above. The illustrated computer system 400 comprises multiple processor units 452A-B that each comprises, in the illustrated embodiment, multiple (N) sets of processor cores 454A-N. Each processor unit 452A-B may comprise on-board memory (ROM or RAM) (not shown) and off-board memory 456A-B. The on-board memory may comprise primary, volatile and/or non-volatile storage (e.g., storage directly accessible by the processor cores 454A-N). The off-board memory 456A-B may comprise secondary, non-volatile storage (e.g., storage that is not directly accessible by the processor cores 454A-N), such as ROM, HDDs, SSD, flash, etc. The processor cores 454A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 450 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 454 may train and/or implement different networks or subnetworks or components. For example, in one embodiment, the cores of the first processor unit 452A may implement the encoder 104, 204 and 404 in FIGS. 1, 2 and 4A, and the second processor unit 452B may implement the decoder 106, 206 and 406 in FIGS. 1, 2 and 4A. In other embodiments, different sets of cores in the first processor unit 452A may be responsible for the encoder 104, 204, 404 and the decoder 106, 206, 406. Also, one or more of the processor cores 454 and/or one or more of the processor units could implement other components in the systems herein, such as the classifier/detector 208, the generator 302, the degradation regression system 412, the denoising system 408, etc. One or more host processors 450 may coordinate and control the processor units 452A-B.

In other embodiments, the system 400 could be implemented with one processor unit 452. In embodiments where there are multiple processor units, the processor units could be co-located or distributed. For example, the processor units 452 may be interconnected by data networks, such as a LAN, WAN, the Internet, etc., using suitable wired and/or wireless data communication links. Data may be shared between the various processing units 452 using suitable data links, such as data buses (preferably high-speed data buses) or network links (e.g., Ethernet).

The software for the various computer system 400s described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

Figure 6:
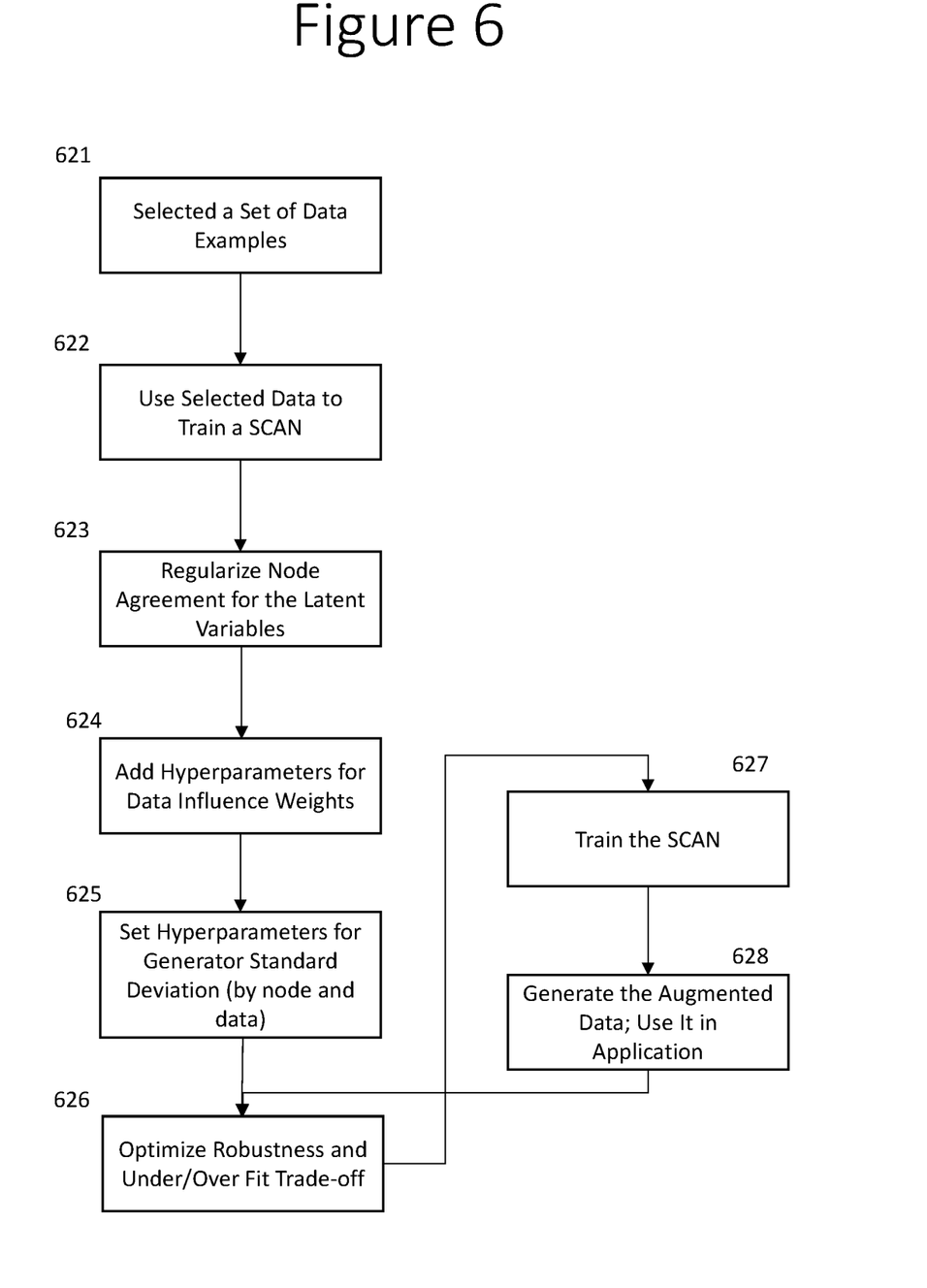
FIG. 6 is a flow chart of an aspect of the invention that may be used in various embodiments.

FIG. 6 is a flowchart of an illustrative embodiment using a generator to augment a selected set of data. The process illustrated in FIG. 6 could be performed by a computer system, such as the computer system 400 shown in FIG. 4. At block 621, the computer system selects the set of data to be augmented. The selected set of data can be, for example: all the data in a training set; all the data in a single classification category; the data in a data cluster; or any other set with a known selection criterion. In some embodiments, the selected data may be one of the sets mentioned above subject to one or more extra conditions, such as that the selected data are also close to a given data example or that the selected data is close to a given decision boundary.

At block 622, the computer system 400 uses the selected data to train a stochastic categorical auto-encoder network, as described, for example, in association with FIG. 1. The training of the SCAN uses a number of hyperparameters as described below.

At block 623, the computer system 400 sets hyperparameters to control a form of node activation regularization for the SCAN herein called "soft tying." Soft-tying is described in the above-incorporated '754 Provisional Application. If the set of data is a cluster or local to a data example, then preferably the nodes corresponding to the latent variables are soft-tied across all the data. If the data set is more diverse, then data examples within a cluster can be soft-tied with a greater strength and larger groups can be soft-tied with a lesser strength.

At block 624, the computer system 400 sets hyperparameters for "data influence" weights data examples in the selected data. In an illustrative embodiment, there is one such weight for each data example. The contribution of each data example to any quantity that is summed across the data examples is multiplied by this weight. This is equivalent to having the example occur as many times as indicated by the weight. An automatic procedure, such as a learning coach, can adjust this parameter on an example-by-example basis to improve performance. For example, it can lower the weight given to a data example that seems to be causing an increase in the error rate by causing overfitting.

At block 625, the computer system 400 sets hyperparameters for the latent variables representing dispersion (e.g., standard deviations or variances). As an illustrative example, these latent variables can all be set to the same value, which is controlled by a hyperparameter. This choice is adequate for many purposes. However, as with all the hyperparameters, the hyperparameters for the dispersion (e.g., standard deviation) latent variables can be optimized and fine-tuned by a learning coach.

At block 626, the computer system 400 optimizes at least one hyperparameter (e.g., a "data fit" hyperparameter) controlling the degree of fit and the trade-off between overfitting and underfitting the input data. In some embodiments block 626 may have a direct way of measuring or estimating this trade-off. In other embodiments, it measures the effect on performance by experimentally completing blocks 627 and 628 and using the generated data in its intended application. As such, at block 626, the computer system may measure the performance in that application and use such performance measurements to perform the tuning in block 626. This iterative optimization process is indicated by the loop back from block 628 to block 626.

At block 627, the computer system trains the stochastic categorical auto-encoder network using the selected data and the specified hyperparameter values (e.g., including the data fit parameter). Then at block 628, the computer system generates the augmented data using the SCAN trained at step 627 and uses it in the intended application or as a practice application for development.

In one general aspect, therefore, the present invention is directed to computer systems and methods for generating a stochastic categorical autoencoder learning network. The computer system 400 may comprise a set of one or more processor cores 454A-N and computer memory (e.g., off-board memory 456A-B) in communication with the set of processor cores. The computer memory stores software that when executed by the set of processor cores, causes the set of processor cores to train the stochastic categorical auto-encoder network. The method by which the computer system trains the stochastic categorical autoencoder network comprises, with reference to FIG. 1, training an encoder network 104 to output, subject to one or more constraints, parameters for parametric probability distributions of sample random variables from input data. The parameters comprise measures of central tendency (e.g., means) and measures of dispersion (e.g., standard deviations or variances). The one or more constraints comprise a first constraint that constrains a measure of a magnitude of a vector of the measures of central tendency as compared to a measure of a magnitude of a vector of the measures of dispersion. The method by which the computer system trains the stochastic categorical autoencoder network further comprises: generating the sample random variables 105 from the parameters; and training a decoder 106 to output the input data from the sample random variables.

According to various implementations, the encoder and/or the decoder comprise a neural network. Also, the first constraint can be that the measure of the magnitude of the vector of the measures of central tendency cannot grow arbitrarily large relative to the measure of the magnitude of the vector the measures of dispersion. For example, the first constraint may be that the measure of the magnitude of the vector of the measures of central tendency must be less than or equal to a first threshold value and the measure of the magnitude of the vector the measures of dispersion must be greater than or equal to a second threshold value. The first threshold value could equal to the second threshold value. As another example, the measure of the magnitude of the vector the measure of dispersion is a pre-specified value, and the encoder is trained to generate the measures of central tendency based on the pre-specified value for the magnitude of the vector the measure of dispersion.

According to various implementations, both the measure of the magnitude of the vector of the measures of central tendency and the measure of the magnitude of the vector of the measures of dispersion comprise norm measures. The norm measures may be, for example, sup norm, a L1 norm and a L2 norm. Also, the norm measure for the measure of the magnitude of the vector of the measures of central tendency could be the same or different from the norm measure for the measure of the magnitude of the vector of the measures of dispersion.

Also, the probability distributions may comprise independent Gaussian probability distributions, Bernoulli distributions, Poisson distributions, or uniform distributions, for example.

According to various implementations, the computer memory stores software that when executed by the set of processor cores, further causes the set of processor cores to augment a selected set of data by training, at least once, the stochastic categorical autoencoder network with the selected set of data to produce the augmented data. In such a variation, training the stochastic categorical autoencoder network can comprise training the stochastic categorical autoencoder network with a number of hyperparameters, including: a first hyperparameter that controls soft-tying nodes in the stochastic categorical autoencoder network; and a second hyperparameter that control influence weights for data examples in the selected set of data. Also, augmenting the selected set of data can comprise repetitively training the stochastic categorical autoencoder network with selected set of data, with each training after a first training using at least one different hyperparameter than an immediately prior training.

According to yet other various implementations, the computer memory stores software that when executed by the set of processor cores, causes the set of processor cores to: implement a degradation regression system 412 that is trained to estimate an amount of degradation in a pattern that is due to noise; and implement a denoising system 408 that is trained to remove noise in the output of the decoder. In such an embodiment, training the stochastic categorical autoencoder network can comprise back-propagation through the degradation regression system and through the denoising system.

Based on the above description, it is clear that embodiments of the SCANs herein can be used to learn efficient data codings and/or generative models in an unsupervised manner. Such SCANs can be used in or to improve many different types of neural networks, including neural networks used for or in recommender systems, speech recognition systems, and classification systems, including image and diagnostic classification systems, to name but a few examples.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system comprising:
   a set of one or more processor cores; and
   computer memory in communication with the set of processor cores, wherein the computer memory stores software that when executed by the set of processor cores, causes the set of processor cores to train an encoder network of an autoencoder by performing steps that comprise:
      training the encoder network to output, subject to one or more constraints, parameters for parametric probability distributions of sample random variables from input data, wherein:
         the parameters comprise measures of central tendency for latent variables for the parametric probability distributions and measures of dispersion for the latent variables;
         the latent variables for the parametric probability distributions are subject to the one or more constraints; and
         the one or more constraints comprise a first constraint that constrains a ratio of (i) a measure of a magnitude of a vector of the measures of central tendency to (ii) a measure of a magnitude of a vector of the measures of dispersion, such that the measure of the magnitude of the vector of the measures of central tendency cannot grow arbitrarily large relative to a measure of a magnitude of a vector of the measures of dispersion.

2. The computer system of claim 1, wherein:
   the measures of central tendency comprise means; and
   the measures of dispersion comprise standard deviations.

3. The computer system of claim 1, wherein the probability distributions comprise independent Gaussian probability distributions.

4. The computer system of claim 1, wherein the network comprises a neural network.

5. The computer system of claim 4, wherein:
   the measure of the magnitude of the vector the measure of dispersion is a pre-specified value; and
   the neural network is trained to generate the measures of central tendency based on the pre-specified value for the magnitude of the vector the measure of dispersion.

6. The computer system of claim 4, wherein:
   the measure of the magnitude of the vector of the measures of central tendency comprises a norm measure; and
   the measure of the magnitude of the vector of the measures of dispersion comprises a norm measure.

7. The computer system of claim 6, wherein:
   the measures of central tendency comprise means; and
   the measures of dispersion comprise standard deviations.

8. The computer system of claim 6, wherein the norm measure for the measure of the magnitude of the vector of the measures of central tendency is different from the norm measure for the measure of the magnitude of the vector of the measures of dispersion.

9. The computer system of claim 6, wherein each of the norm measures for the measure of the magnitude of the vector of the measure of central tendency and the measure of the magnitude of the vector of the measures of dispersion comprises a norm measure selected from the group consisting of a sup norm, a L1 norm and a L2 norm.

10. The computer system of claim 4, wherein the measures of central tendency comprise means.

11. The computer system of claim 10, wherein the measures of dispersion comprise standard deviations.

12. The computer system of claim 4, wherein:
   the network comprises an autoencoder, wherein the autoencoder comprises an encoder and a decoder; and
   the computer memory stores software that when executed by the set of processor cores, further causes the set of processor cores to:
      train the encoder to output the parameters for the parametric probability distribution;
      generate the sample random variables from the parameters; and
      train the decoder to output the input data from the sample random variables.

13. The computer system of claim 12, wherein the computer memory stores software that when executed by the set of processor cores, further causes the set of processor cores to augment a selected set of data by training, at least once, the network with the selected set of data to produce the augmented data, wherein training the network comprises training the network with a number of hyperparameters, including:

a first hyperparameter that controls soft-tying nodes in the network; and
a second hyperparameter that control influence weights for data examples in the selected set of data.

14. The computer system of claim 13, wherein the computer memory stores software that when executed by the set of processor cores, causes the set of processor cores to augment the selected set of data by repetitively training the network with selected set of data, with each training after a first training using at least one different hyperparameter than an immediately prior training.

15. The computer system of claim 12, wherein the autoencoder comprises a stochastic categorical autoencoder.

16. A method comprising training, with a computer system comprising one or more processor cores, an encoder network of an autoencoder, wherein training the encoder network comprises:
training the autoencoder network to output, subject to one or more constraints, parameters for parametric probability distributions of sample random variables from input data, wherein:
the parameters comprise measures of central tendency for latent variables for the parametric probability distributions and measures of dispersion for the latent variables; and
the one or more constraints comprise a first constraint that constrains a ratio of (i) a measure of a magnitude of a vector of the measures of central tendency to (ii) a measure of a magnitude of a vector of the measures of dispersion, such that the measure of the magnitude of the vector of the measures of central tendency cannot grow arbitrarily large relative to a measure of a magnitude of a vector of the measures of dispersion.

17. The method of claim 16, wherein:
the measures of central tendency comprise means; and
the measures of dispersion comprise standard deviations.

18. The method of claim 16, wherein the network comprises a neural network.

19. The method of claim 18, wherein:
the measure of the magnitude of the vector of the measures of central tendency comprises a norm measure; and
the measure of the magnitude of the vector of the measures of dispersion comprises a norm measure.

20. The method of claim 18, wherein:
the network comprises an autoencoder, wherein the autoencoder comprises an encoder and a decoder;
the step of training the network comprises training the encoder to output the parameters for the parametric probability distribution; and
the method further comprises:
generating, by the computer system, the sample random variables from the parameters; and
training, by the computer system, the decoder to output the input data from the sample random variables.

21. The method of claim 20, further comprising augmenting a selected set of data by training, at least once, the network with the selected set of data to produce the augmented data, wherein training the stochastic categorical autoencoder network comprises training the stochastic categorical autoencoder network with a number of hyperparameters, including:
a first hyperparameter that controls soft-tying nodes in the stochastic categorical autoencoder network; and
a second hyperparameter that control influence weights for data examples in the selected set of data.

22. The method of claim 21, wherein augmenting the selected set of data comprises repetitively training the stochastic categorical autoencoder network with selected set of data, with each training after a first training using at least one different hyperparameter than an immediately prior training.

23. The method of claim 20, wherein the autoencoder comprises a stochastic categorical autoencoder.

* * * * *